United States Patent [19]

Kibby

[11] Patent Number: 4,647,214

[45] Date of Patent: Mar. 3, 1987

[54] COMESTIBLE CONVERTING APPARATUS

[75] Inventor: Leroy Kibby, Omaha, Nebr.

[73] Assignee: Whirla-Whip Systems, Inc., Omaha, Nebr.

[21] Appl. No.: 787,901

[22] Filed: Oct. 15, 1985

[51] Int. Cl.$^4$ ............................................... B01F 7/24
[52] U.S. Cl. .................................... 366/212; 366/250; 366/279
[58] Field of Search ............... 366/212, 215, 216, 218, 366/185, 189, 144, 149, 147, 250, 249, 203, 197, 196, 318, 106, 194, 195, 61, 279; 99/348, 452, 494

[56] References Cited

U.S. PATENT DOCUMENTS

| | | | |
|---|---|---|---|
| 2,626,132 | 1/1953 | Reed | 366/206 |
| 2,626,133 | 1/1953 | Reed | 366/206 |
| 3,061,279 | 10/1962 | Reed | 366/212 |
| 4,042,221 | 8/1977 | Myers | 366/250 |
| 4,448,114 | 5/1984 | Mayer | 99/494 |
| 4,548,508 | 10/1985 | Verkler | 366/195 |

Primary Examiner—Robert W. Jenkins
Attorney, Agent, or Firm—G. Brian Pingel; Kent A. Herink

[57] ABSTRACT

An improved apparatus for pressuring a hard frozen comestible, similar to hardened ice cream, while simultaneously subjecting it to mechanical action to reduce the crystal and cell structure of the material to transform it into a soft, smooth and creamy texture only slightly less cold than its starting temperature. The apparatus includes a hopper for receiving the hard frozen comestible to be treated, an auger positioned above the hopper and automatically actuated by movement of the hopper toward the auger to produce conditioning of the comestible by the auger as the hopper and auger move toward one another into an adjacent relationship. The auger is powered by a drive assembly that includes an electrically driven motor and a fluid drive unit to provide a constant drive force on the auger without undue stress on the drive motor.

4 Claims, 6 Drawing Figures

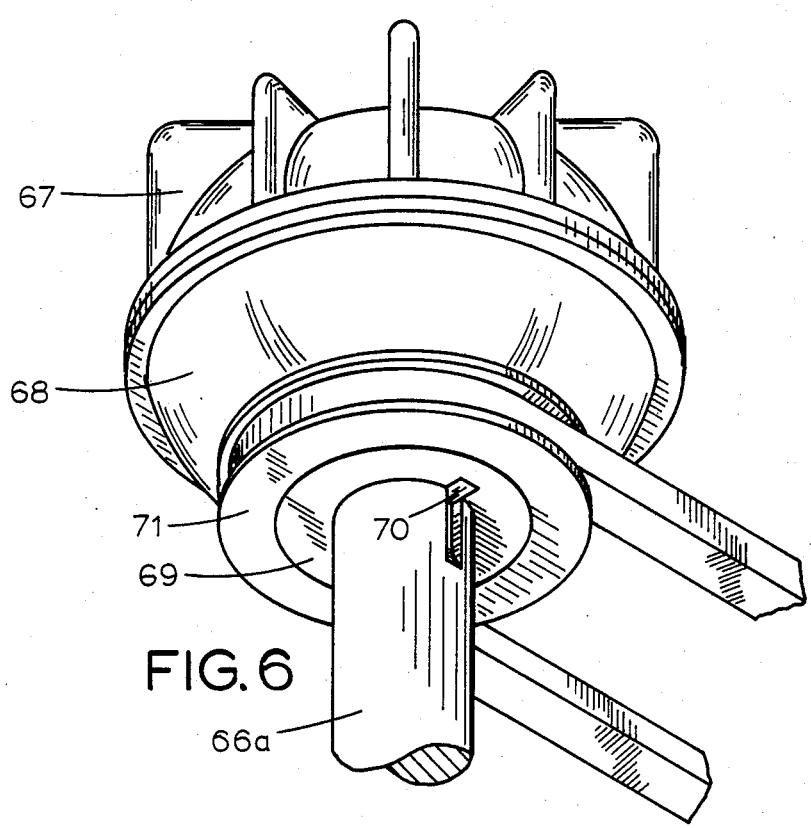

COMESTIBLE CONVERTING APPARATUS

BACKGROUND OF THE INVENTION

1. Field of the Invention

The present invention relates to apparatus for processing solid frozen comestibles into a smooth, soft and creamy texture, and relates more specifically to such apparatus that is adapted for continuous operation without causing overheating or undue wear thereto.

2. Description of the Prior Art

Apparatus of the type as generally described herein have been known in the prior art for several decades as shown and disclosed in prior U.S. Pat. No. 2,626,133, "Apparatus for Processing Frozen Comestibles" issued Jan. 20, 1953; U.S. Pat. No. 2,626,132, "Mixing Device for Frozen Comestibles" issued Jan. 20, 1953; and U.S. Pat. No. 3,061,279, "Apparatus for Processing Frozen Comestibles" issued Oct. 30, 1962.

In the above patents, the desirability of and equipment for transforming a hard frozen ice cream product to a product for consumption more closely resembling the soft, smooth, creamy and palatable condition of fresh frozen product was disclosed. Subsequent to such disclosure, apparatus made in accordance with the above patents have been employed in the United States and throughout Canada. However, because of certain deficiencies in the apparatus and process for transforming the frozen comestible, the prior art devices never became successful in the United States.

Recently, improvements have been made in the prior art devices to adapt them to a more marketable form in which the processing of frozen comestible may be accomplished in an economically feasible fashion. As a result, such machines have become highly popular and are used in a wide variety of fast food restaurants and ice cream shops. However, it has been found that during particularly busy periods of use that even the improved machines suffer from the deficiency of overheating and undue wear on their electrical motors. The present invention is designed to overcome this problem and provide a machine that can be used continuously without adverse affect.

SUMMARY OF THE INVENTION

The present invention provides an improved apparatus for converting a solid pre-frozen comestible to a semi-solid form having a soft, smooth and creamy texture, but yet is only slightly less cold than the starting material. To permit such apparatus to operate in a substantially continuous mode, the invention includes a fluid drive means that regulates the operation of the apparatus to prevent overheating or excessive wear of the drive motor.

Preferably, the apparatus is installed in a decorative, eye appealing cabinet that conceals a vertical structural frame. Upper and lower support members are affixed to the frame in a vertically spaced apart relation with a track means connected there between and a vertically aligned tapered auger rotatably mounted from the upper support member.

A vertically movable saddle means normally rests upon the lower support means and is associated with and guided by the track means upon actuation of a linkage means connected between the structural frame and the saddle means. A frusto-conically shaped hopper for receiving frozen comestible is seated upon the saddle means. The hopper includes a large upper opening and a lower narrow discharge opening and is in axial alignment with said auger so that as the saddle means is elevated through actuation of the linkage means, the hopper is raised to receive the auger in an operative relationship. The outer periphery of the auger is adjacent the interior of the hopper so that as the auger is driven, it advances the comestible in the hopper downwardly toward the lower opening thereof from which it exits in its smooth, soft and creamy texture.

The apparatus includes an electrically driven motor, the drive power of which is transferred to the auger by means of a fluid drive unit and associated drive train to protect the motor from excessive operating conditions when the auger is under a large load. Accordingly, an operator of such apparatus need not be skilled or highly trained to use it properly without causing overheating or excessive wear on the motor.

The invention will appear more clearly from the following detailed description when taking in conjunction with the accompanying drawings, showing by way of example, a preferred embodiment of the inventive idea wherein like numerals refer to like parts throughout.

DESCRIPTION OF THE DRAWINGS

FIG. 6 is a perspective partial view of the drive assembly shown in FIG. 3.

DESCRIPTION OF THE PREFERRED EMBODIMENT

Figure 1:
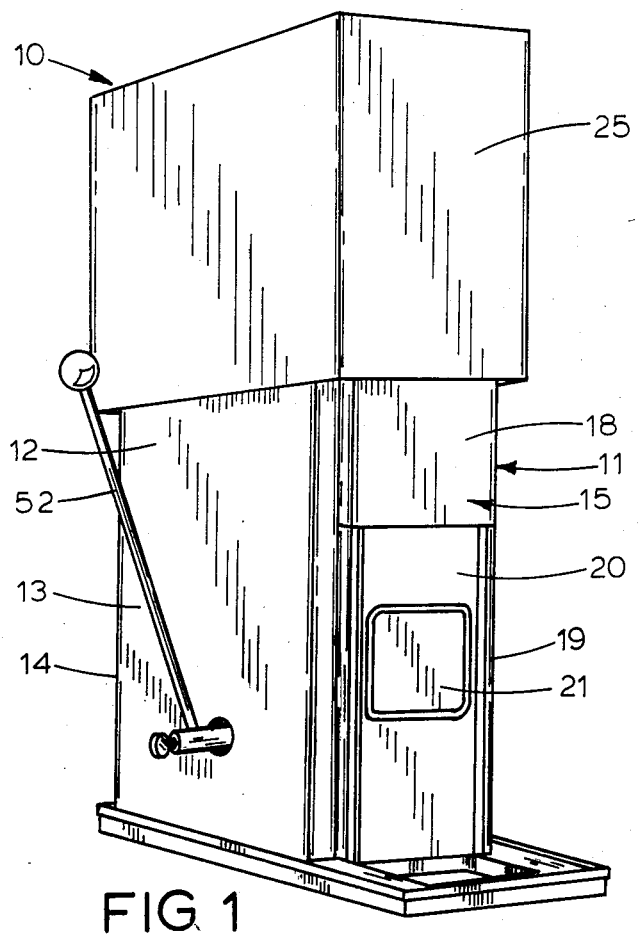
FIG. 1 is a perspective front view of a preferred embodiment of the apparatus of the present invention for processing frozen comestibles.

Referring now to the drawings and with reference first to FIG. 1, a preferred embodiment of an improved frozen comestible conditioning apparatus 10 of the present invention is shown. As described in prior patents referred to in the Background of the Invention herein, which patents are incorporated herein by reference, the present invention provides a device for preferably processing solid frozen ice cream or ice milk by subjecting it to mechanical action which plasticized, needed and vigorously remixed the hard frozen product, thus reducing the crystal and cell structure of the material to thereby produce a soft, smooth and creamy texture, but with a temperature only slightly less cold than the starting temperature. Although the invention is described herein with respect to ice cream, it should be understood that the present invention is equally adaptable for use with ice milk, frozen yogurt and other comestibles.

The apparatus 10 preferably includes an attractive styled housing 11 that serves to enclose all of the working components thereof and yet still provide for ready access to permit supply of frozen ice cream to the interior and receipt of the processed product after conditioning. The specific construction of the housing 11 is not crucial to the present invention. However, it is important that the sidewalls of the housing 11 are free of cracks or crevices in which waste material may lodge. Thus, preferably, the housing 11 includes an integral three-sided cover member 12 that serves as the sidewalls 13 and rear wall 14 of the housing and is formed of stainless steel.

The front face of the housing 11 is provided by a one piece plate 15 that includes an upper planar section 18 and lower leg member 19, and is connectible to the cover member 12. A plastic panel member 20 fits within the space provided between the legs of the plate 15 and has a hinged door for access to the housing interior. A cap member 25 covers the upper portion of the housing 11, and the bottom of the housing is substantially open. However, the apparatus 10 is designed to sit atop a freezer containing frozen comestible product.

Figure 2:
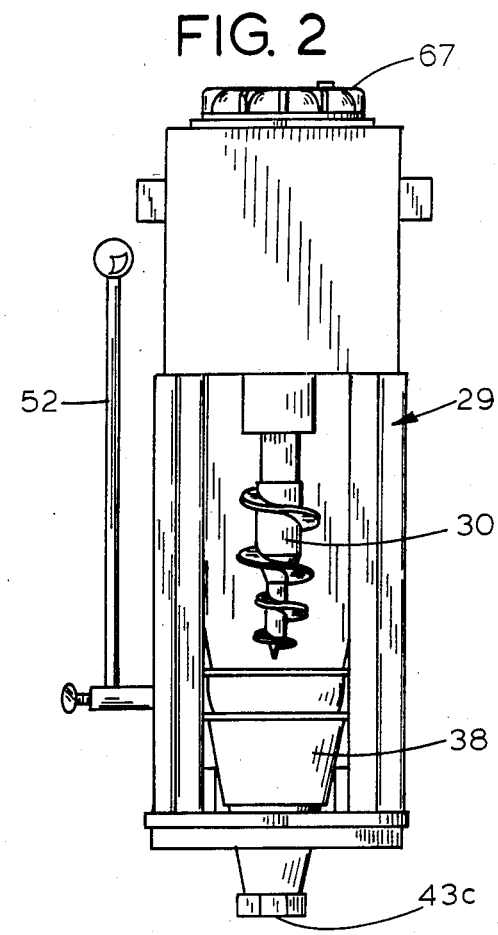
FIG. 2 is a front view of the apparatus of FIG. 1 with the housing of the apparatus removed to expose the internal operating members thereof, and particularly showing an auger below which is located a hopper supported by a vertically movable saddle member.
Figure 3:
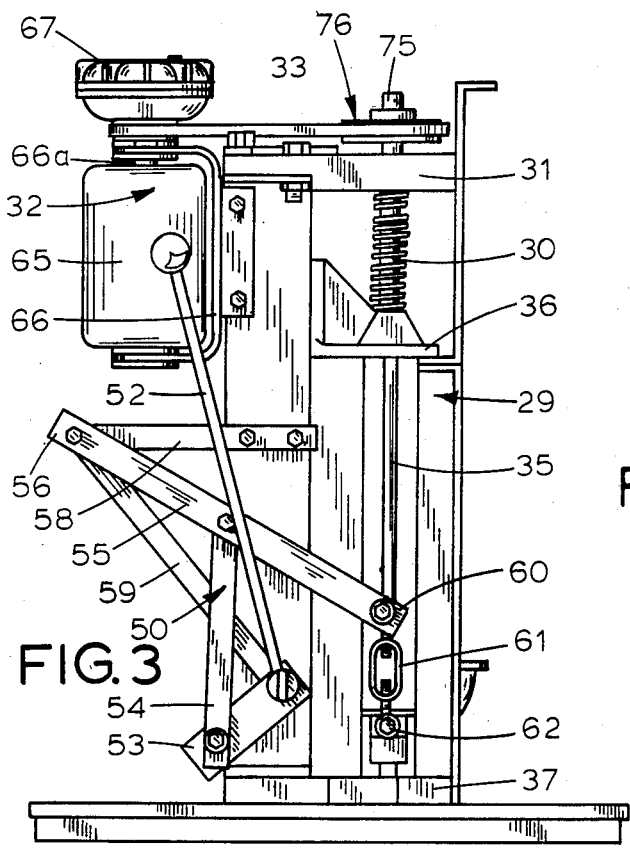
FIG. 3 is a side view of the apparatus of FIG. 2 particularly showing both a linkage assembly for moving the saddle member and a drive assembly including an electric motor and a fluid driven unit for rotatably driving the auger.

Referring now to FIGS. 2 and 3, the apparatus 10 is shown with the housing 11 and cap member 25 removed to reveal an interior structural frame 29 that serves to support in position the other internal components of the apparatus 10. As disclosed in the prior "279" patent described in the Background of the Invention, the apparatus 10 includes an auger 30 suspended from an upper support arm 31 (FIG. 3) of the frame 29. The auger is powered by a drive assembly 32 mounted on the rear of the structural frame 29. The height of the auger 30 is fixed so it will have no substantial vertical movement as it is rotatably driven by the assembly 32. Thus, it is necessary for the device 10 to include an ice cream hopper that is lifted into position adjacent the auger 30 for processing of the ice cream, as will now be described.

Figure 5:
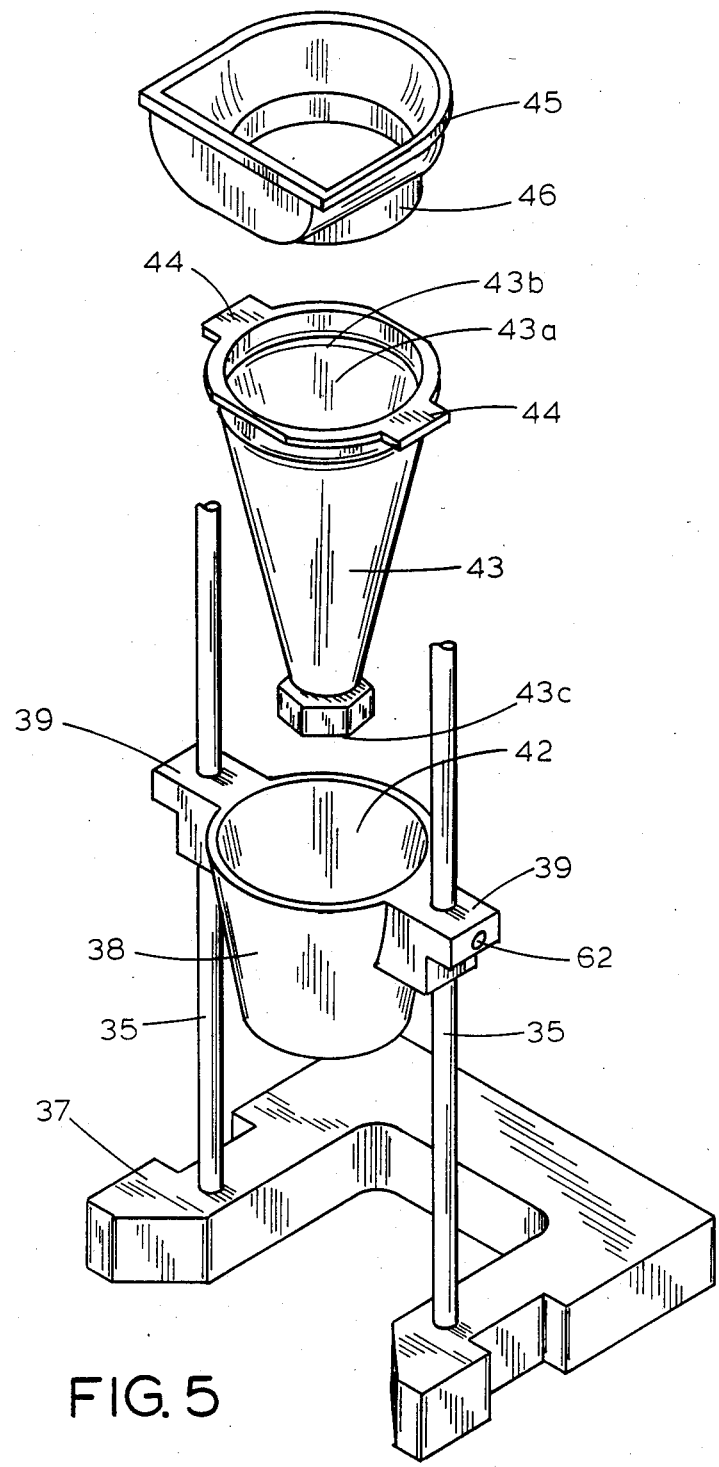
FIG. 5 is an exploded perspective view of certain interior components of the apparatus of FIG. 2 and particularly showing the movable saddle member, the hopper supported thereon, and a filler guide for the hopper.

The device 10 includes a pair of vertically aligned, spaced apart rods 35 fixed in place between a upper support member 36 and lower support member 37 respectfully of the frame 29 (See FIG. 3). Referring now to FIG. 5, a saddle member 38 is provided in a guided relation to the rods 35 by means of ears 39 through which the rods 35 loosely extend. The saddle member 38 has a large central opening 42 for receiving a conically shaped hopper 43.

The hopper 43 is adapted for reception into the central opening 42 of the saddle 38 with flanges 44 on the upper periphery of the hopper serving as abutment members for seating on the upper periphery of the saddle member central opening 42. The hopper 43 has a central passageway 43(a) with a large upper opening 43(b) and a small lower opening 43(c) that must be small enough to hold the unprocessed ice cream in the hopper until it is conditioned. A loading funnel 45 has a neck portion 46 adapted to fit in the upper portion of the hopper 43 so that the funnel 45 can serve as a guide member for directing frozen comestibles into the hopper 43.

Figure 4:
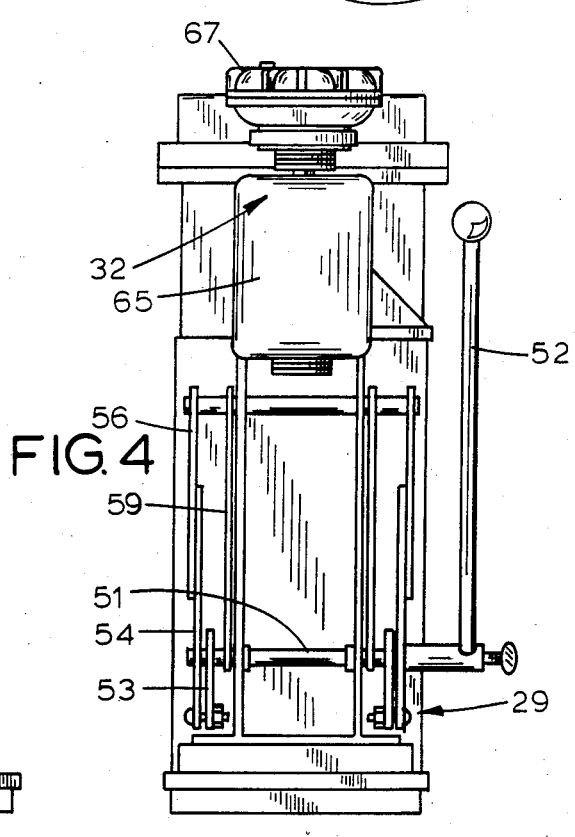
FIG. 4 is a rear view of the apparatus of FIG. 2.

To elevate the saddle member 38 and its associated hopper components, the device 10 includes a linkage assembly 50 (best shown in FIGS. 3 and 4). The assembly 50 includes an axle member 51 (FIG. 4) that is journaled through the frame 29 and has one end attached to a lever 52 for providing selective actuation of the linkage assembly 50. Fixed to the axle 51 are a pair of link members 53 which move in a clockwise fashion upon forward movement of the lever 52. The opposite ends of the links 53 are pivotally connected to links 54 that interconnect the links 53 with yet another pair of links 55. Upper ends 56 of the links 55 are pivotally connected to two pairs of support struts 58 and 59 whereas lower ends 60 are each connected by a turn buckle 61 into a tapped hole 62 (FIGS. 3 and 5) on each ear 39 of the saddle member 38.

As the link members 53 move in a clockwise fashion about the axle 51 upon forward movement of the lever 52, the link members 54 will move essentially in a vertical fashion to elevate the lower ends 60 of the links 55 and thereby raise the saddle member 38 and its associated hopper member 43 in a vertical direction toward the auger 30. As this upward movement occurs, the drive assembly 32 powering the auger 30 is electrically activated to begin rotation of the auger. As the hopper 43 is moved into a position whereby the flights of the auger 30 are adjacent the conical interior of the sidewall of the passageway 43(a), a processing action of any frozen comestible in the hopper 43 is provided to direct the comestible downward through bottom discharge opening 43(c) of the hopper in a soft, smooth texture into a dish, cone or cup held beneath the lower hopper opening 43(c).

Preferably, the drive assembly 32 includes a prime mover in the form of an electrically driven motor 65 (FIG. 3) mounted in a vertical orientation by a C-shaped bracket 66 bolted to the structural frame 29. The motor 65 has an upwardly directed drive shaft 66a extending into a fluid drive unit 67 of the type that is well known in the art and is preferably a Model FV supplied by Fluid Drive Engineering Co., of Wilmette, Ill. The drive unit 67 has a housing 68 and a hollow shaft 69 that receives and is affixed to the motor drive shaft 66a by a key 70 or the like. The shaft 69 extends into the interior of the housing 68 and is connected to a drive vane (not shown). A complimentary drive vane (not shown) is attached to the interior of the housing 68 and the housing is filled with oil that transmits drive force from the shaft 69 to the housing 68 which is rotatable with respect to the shaft 69. A pulley 71 is formed in the bottom of the housing 68 and is connected to a shank 75 (FIG. 3) of the auger 30 by means of a belt and pulley drive train shown generally at 76. Thus, the fluid drive unit 67 provides an indirect drive linkage between electric motor 65 and the auger 30.

Prior art devices to the present invention did not include an indirect connection between the motor 65 and auger 30, but instead, the motor was directly connected to the auger by means of a belt and pulley drive train. Such prior art devices have proved unsatisfactory during busy periods of operation because excessive stress is placed upon the motor 65 resulting in overloading of the electrical circuit driving the apparatus 10 or premature failure of the motor 65. The reason for this problem with prior art devices is the nature of the frozen comestible that is processed by the apparatus 10.

To provide proper processing, the comestible must be hard frozen and preferably in a disc shaped portion which is dropped into the hopper 43. As the hopper 43 is moved upward to initiate processing, the auger 30 engages the frozen product which resists and actually slows down the rotational motion of the auger 30 until the product is softened and spread out due to the pressure of the auger. This resistive stress on the auger 30 places an excessive load on the motor 65 as it attempts to continue driving the auger 30 and often results in interruptions in operation and premature equipment failure.

By addition of the fluid drive unit 67, the auger 30 is no longer directly connected to the motor 65 so that when the retarding force is exerted on the auger 30, the drive unit 67 isolates such force from the motor 65, which is therefore unaffected thereby. In this way, the rotational speed of the auger 30 is permitted to decrease at the beginning of the processing of the comestible product in the hopper 43. As the retarding force of the product decreases, the auger 30 is automatically increased in speed until it again reaches its normal rotational speed. As can be seen, this action is performed regardless of how the machine is operated so that the apparatus 10 requires little operator experience. Thus, the present invention provides an improved comestible converting apparatus than can be used in substantially continuous operation without fear of overloading the circuit powering the apparatus or burn-out of the motor 65.

I claim:

1. An improved apparatus for converting a solid prefrozen comestible to semi-solid condition comprising:
 a. a vertical structural frame;
 b. an upper support means affixed to said frame;
 c. a lower support means affixed to said frame below said upper support means in a spaced apart relation thereto and having a central opening;
 d. a vertically aligned tapered auger rotatably mounted from said upper support member with its tapered most end pointing downwardly;
 e. track means connected between said upper and lower support means;
 f. a vertically movable saddle means that normally rests upon said lower support means and is associated with and guided by said track means, said saddle means having a body portion with a vertically aligned center bore;
 g. linkage means connecting between said structural frame and said saddle means;
 h. lever means rotatably mounted from said structural frame and movable to actuate said linkage means and thereby selectively control the vertical elevation of said saddle means from said lower support means;
 i. a frusto-conically shaped hopper that receives said frozen comestible and includes an upper large opening and a lower narrow opening, said hopper being seated in the center bore of said saddle member in axial alignment with said auger in such fashion that as the saddle means is elevated by the actuation of said linkage means, the hopper is raised to receive the auger in an operative relationship whereby the outer periphery of the auger is adjacent the interior of the hopper; and
 j. motor means mounted on said structural frame;
 k. fluid drive means powered by said motor means and operatively interconnected between said motor means and said auger means for turning said auger about a vertical axis during reception of the auger in said hopper to advance the comestible in the hopper downwardly toward the lower opening thereof.

2. An improved comestible converting apparatus as recited in claim 1 wherein said motor means is formed of an electric motor having a drive shaft connected with said fluid drive means.

3. An improved comestible converting apparatus as recited in claim 2 wherein said fluid drive means include a fluid drive unit and a drive train connected to said auger.

4. An improved comestible converting apparatus as recited in claim 3 wherein said electrical motor is vertically oriented with its drive shaft extending upwardly so that said fluid drive unit is positioned directly above said motor.

* * * * *